May 1, 1923.

Re. 15,591

J. G. DE REMER

REFRIGERATING APPARATUS

Original Filed Jan. 16, 1918

5 Sheets-Sheet 1

INVENTOR
JAY GRANT DE REMER
BY Jeffery, Kimball & Eggleston
ATTORNEYS

May 1, 1923. Re. 15,591
J. G. DE REMER
REFRIGERATING APPARATUS
Original Filed Jan. 16, 1918 5 Sheets-Sheet 2
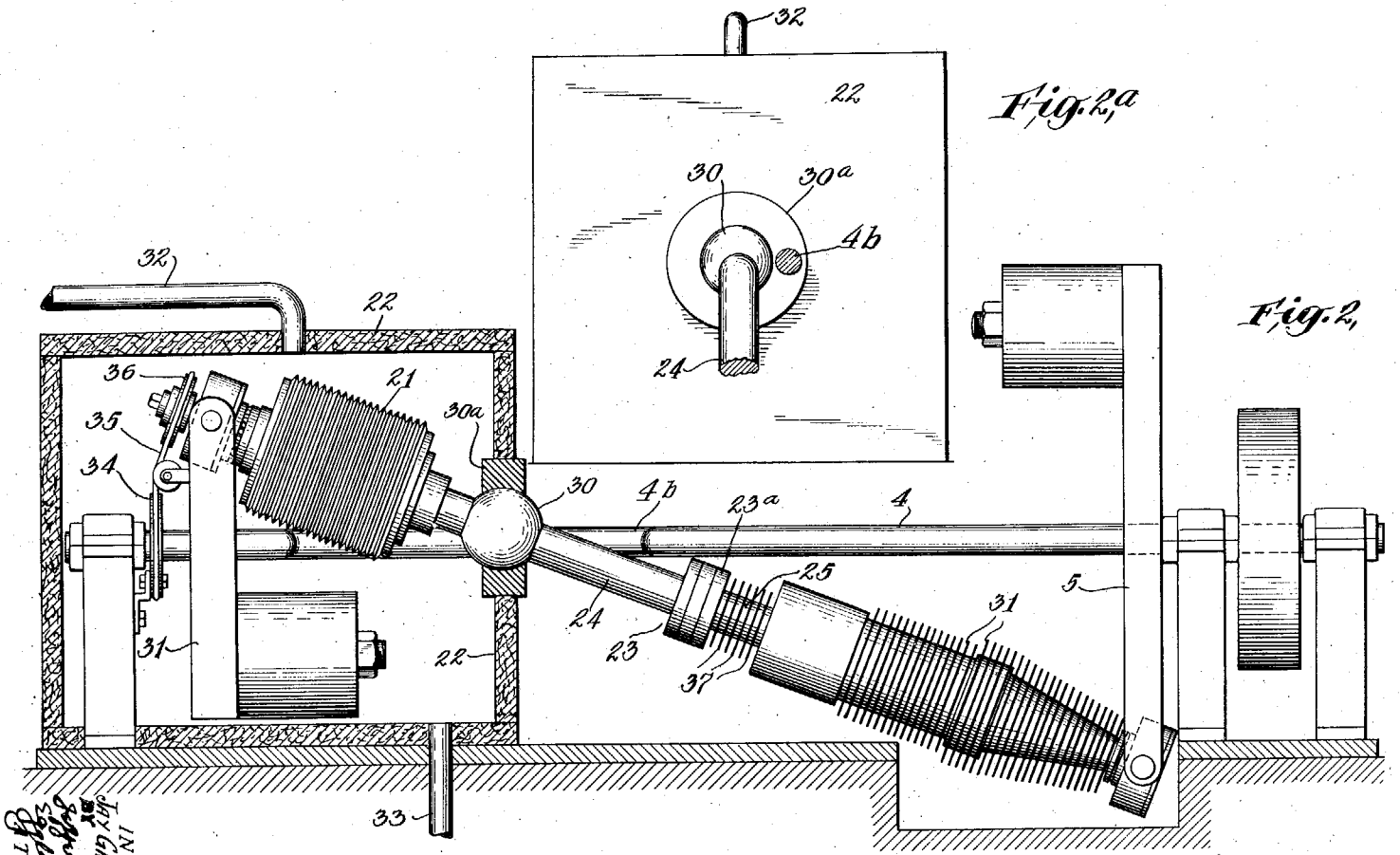
INVENTOR
JAY GRANT DE REMER
BY
Jeffery, Kimball & Eglston
ATTORNEYS May 1, 1923. Re. 15,591
J. G. DE REMER
REFRIGERATING APPARATUS
Original Filed Jan. 16, 1918 5 Sheets-Sheet 3
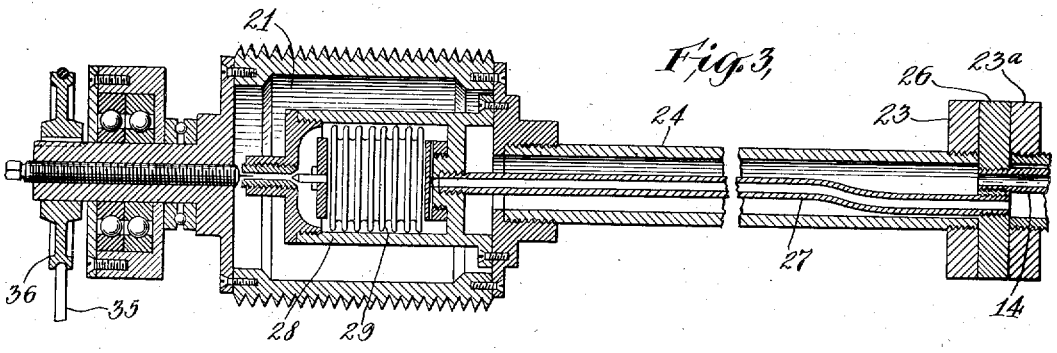
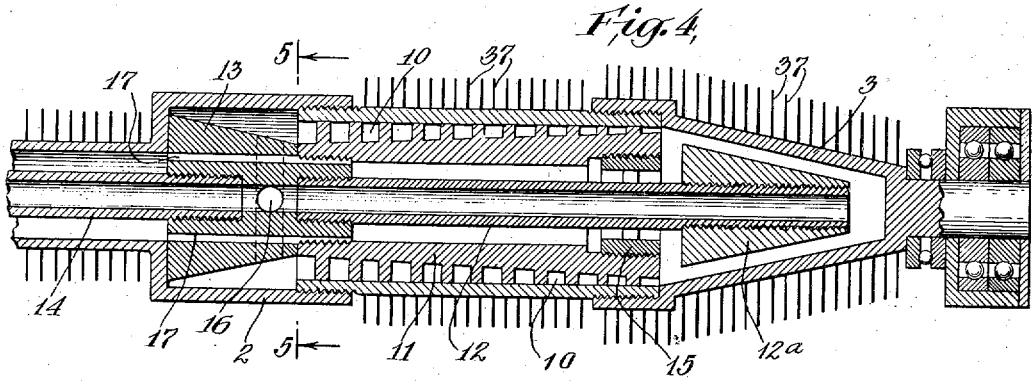
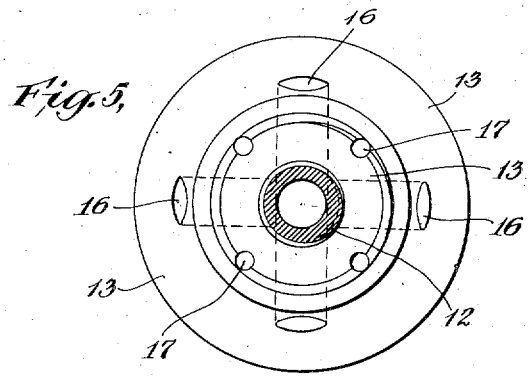
INVENTOR
JAY GRANT DE REMER
BY Jeffery, Kimball & Eggleston
ATTORNEYS May 1, 1923. Re. 15,591

J. G. DE REMER

REFRIGERATING APPARATUS

Original Filed Jan. 16, 1918 5 Sheets-Sheet 4

INVENTOR
JAY GRANT DE REMER
BY Jeffrey, Kimball & Eggleston
ATTORNEYS

May 1, 1923. Re. 15,591
J. G. DE REMER
REFRIGERATING APPARATUS
Original Filed Jan. 16, 1918 5 Sheets-Sheet 5
Fig. 7,
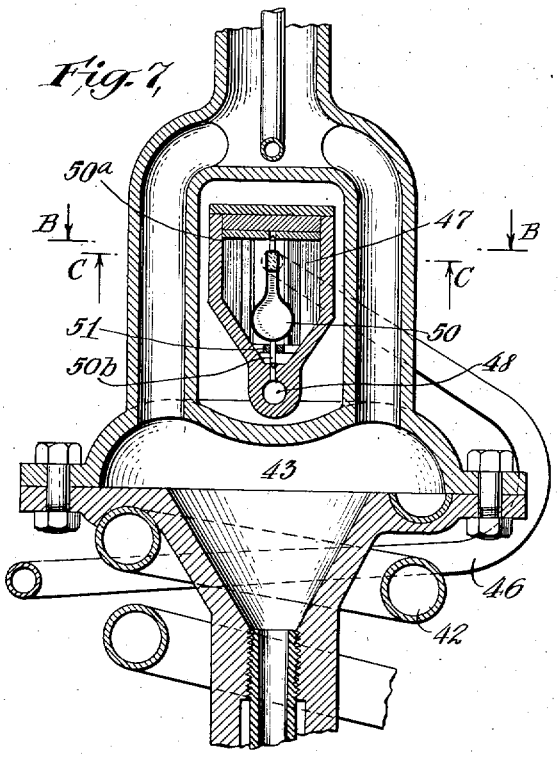
Fig. 8,
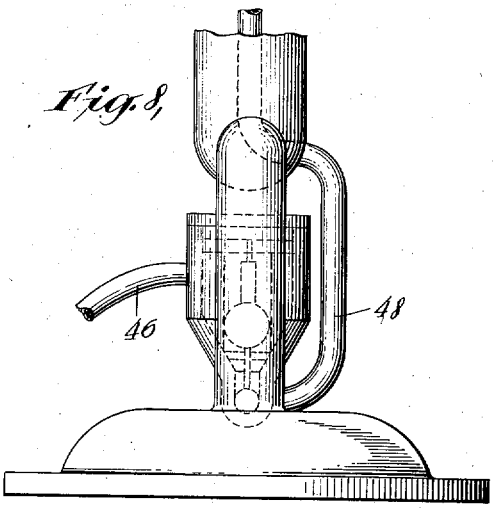
Fig. 9,
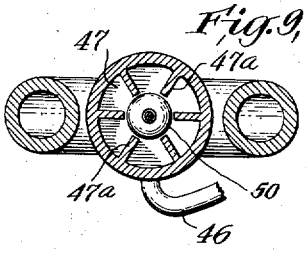
Fig. 11,
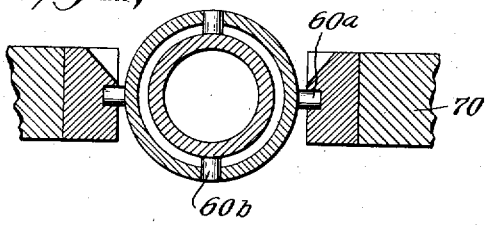
Fig. 10,
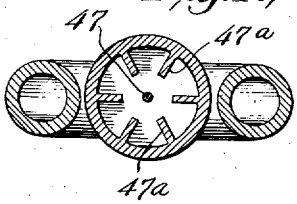
Fig. 12,
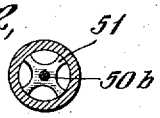
INVENTOR
JAY GRANT DE REMER
BY Jeffery, Kimball & Eggleston
ATTORNEYS Reissued May 1, 1923. Re. 15,591

UNITED STATES PATENT OFFICE.

JAY GRANT DE REMER, OF GREENWICH, CONNECTICUT.

REFRIGERATING APPARATUS.

Original No. 1,373,174, dated March 29, 1921, Serial No. 212,118, filed January 16, 1918. Application for reissue filed March 23, 1923. Serial No. 627,217.

*To all whom it may concern:*

Be it known that I, JAY GRANT DE REMER, a citizen of the United States, a resident of Greenwich, county of Fairfield, and State of Connecticut, formerly a resident of the city of Washington, District of Columbia, have invented certain new and useful Improvements in Refrigerating Apparatus, of which the following is a specification.

The present invention relates to refrigerating apparatus in which separate bodies of refrigerant fluid are compressed by the action of separate bodies of compressor liquid.

One of the objects of the invention is to provide an apparatus adapted for the purposes stated which does not require the use of valves, stuffing boxes, glands, piston rings or external moving parts, such as piston rods, valve stems &c.

While the subject matter of the invention is capable of use in various ways and arts, it is particularly adapted for use with refrigeration apparatus and two embodiments thereof for this purpose are illustrated in the accompanying drawings. For use in connection with small household refrigerating systems the improvements present many advantages. As the compressor liquid and fluid to be compressed are caused to travel through continuously closed paths, there is no danger of loss due to leakage or wasting. Further the construction is such that there is no chance of the refrigerant escaping and creating fumes that might be injurious to health. The apparatus comprises a minimum number of parts compactly arranged and requires practically no attention while in use.

In the accompanying drawings:

Figure 2 is an elevation of a refrigeration apparatus including a compressor of the type shown in Fig. 1;

Fig. 2[a] is an end view of the receptacle shown in Fig. 2, showing the shaft passing into the receptacle.

Figure 6:
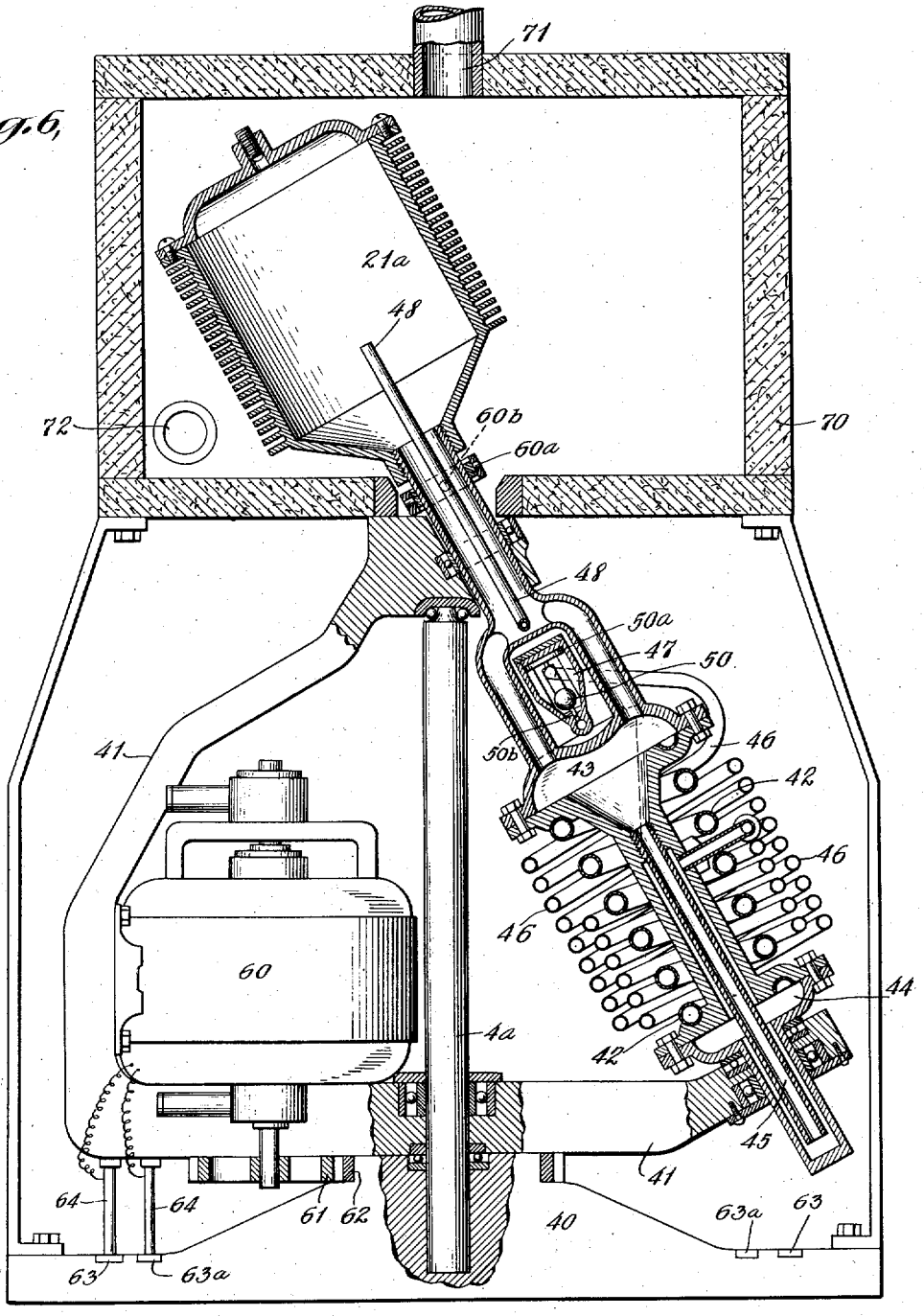

Fig. 3 is a longitudinal sectional view, on an enlarged scale, of the evaporator and expansion valve of the refrigeration apparatus of Fig. 2;

Fig. 4 is a similar view of the compressor of that apparatus;

Fig. 5 is a transverse sectional view on the line 5—5 of Fig. 4;

Fig. 6 is a view, partly in longitudinal section and partly in side elevation, of a slightly different embodiment of the invention;

Fig. 7 is a sectional view, on an enlarged scale, of a portion of the apparatus shown in Fig. 6;

Fig. 8 is an elevation of parts shown in Fig. 7;

Figs. 9 and 10 are sectional views on the lines B—B and C—C of Fig. 7, respectively;

Fig. 11 is a detail sectional view of the upper support or bearing for the compressor:

Fig. 12 is a detail of the guide for the lower end of the valve controlling escape of compressed fluid from the compressor.

Figure 1:
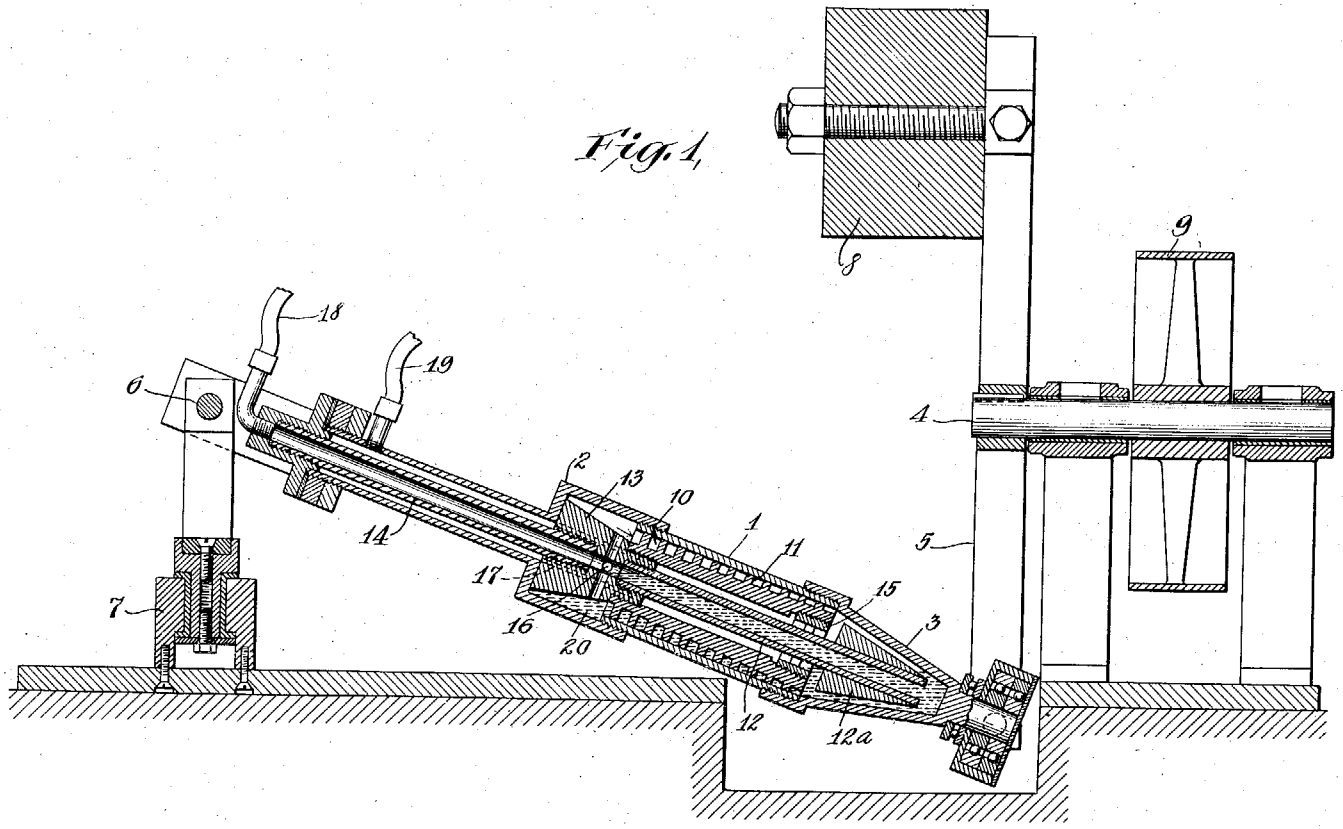
Figure 1 is a longitudinal sectional view of a compressor constructed in accordance with the present invention.

Referring first to Fig. 1, which illustrates a compressor embodying the invention detached from any other apparatus and which may be considered as illustrating, more or less diagrammatically, the principle or method of operation employed, 1 designates a shell or casing to the ends of which suitable caps 2, 3 are secured. Said casing is so supported that it is adapted to rotate bodily about the axis of a shaft 4 but does not rotate upon its own axis.

The compressor body, comprising the shell or casing 1 and end sections 2, 3, is held at a considerable angle to the axis of shaft 4, the cap or end section 3 being shown as connected to an arm 5 while an extension of the end 2 is supported on a bearing situated coincident with a prolongation of the axis of said shaft. In the form illustrated the shaft 4 is arranged horizontally and the end of the inclined compressor nearest the axis of said shaft is supported by a universal joint comprising a horizontal shaft 6 mounted at the upper end of a yoke supported to turn about a vertical axis in a base piece 7.

The weight of the several parts is balanced about the axis of shaft 4 by a counterweight 8 and on said shaft is secured a power wheel or pulley 9.

Within the casing 1 is provided a helical passage 10 which is gradually reduced in area, or cross section, from its inlet end, adjacent the cap 2, to its delivery end. As shown in this passage is formed by a peripheral groove or thread on a tubular body 11 which fits tightly within the shell or casing 1. In practice it is preferred to provide two of such helical passages arranged as a double thread.

A conduit 12 extends axially through the body 11 and projects into the end section 3 within which it is provided with an enlargement 12[a] the exterior of which is of the same form but smaller than the chamber in the end or head 3. Said conduit is held in engagement with the body 11 by a coupling sleeve 13 that is screwed thereon and into the end of said body. Said sleeve is of such length that it extends to the end wall of the section 2 and is also fitted on the end of a conduit 14 by which the fluid to be compressed is supplied to the chamber within the cap or end section 2. A collar 15 is screwed into a socket at the lower end of body 11, about the conduit 12, said collar having a plurality of inwardly projecting radial studs or pins that contact with the conduit and assist in maintaining it in the desired relation to the body 11.

The supply conduit 14 through which the fluid to be compressed is supplied to the apparatus communicates with the chamber in the end section 2 adjacent the inlet end of the passage 10 through a plurality of radially extending ducts 16. A series of longitudinally extending ducts 17 in the body of the coupling sleeve 13 connect the passage surrounding the conduit 12 with the interior of the tubular extension of the end member 2 to provide a passage for the compressed fluid from the space surrounding the conduit 12 which communicates with the chamber in the head or end section 3.

18, 19 designate, respectively, flexible pipes or tubes for supplying fluid to be compressed to the conduit 14 and for the escape of compressed fluid from the space surrounding said conduit.

A body 20 of suitable liquid, for example mercury, is introduced into the chamber in the end or head 2 and as the shaft 4 is revolved separate masses of such liquid will under the action of centrifugal force successively enter the passage 10 and act to compress the intermediate bodies of fluid received therein from the chamber about the coupling sleeve 13. The compressed fluid and mercury will be separated in the space surrounding the enlargement on the end of the conduit 12 the mercury being forced back through said tube, against the centrifugal force, by the pressure generated, until it reaches the ducts 16 through which it passes into the chamber surrounding the coupling sleeve 13 thus completing its circuit. The compressed fluid passes through the space surrounding the conduit 12 and the ducts 17 into the tubular extension of the end section 2 and to the pipe 19.

As heretofore stated the improvements are particularly adapted for use with refrigeration apparatus and for such purpose the conduits 18, 19, are connected with a suitable expansion valve and evaporation chamber whereby the compressed fluid is caused to extract heat from a circulating body of brine or air, for example, as it passes from one of said conduits to the other. The heat thus extracted is given off by the compressed fluid upon its condensation in a suitable chamber, or this may be accomplished by adding sufficient radiating surface to the compressor itself.

In the embodiment of the invention for this purpose illustrated in Fig. 2 the extension of the compressor head 2 communicates with a suitable evaporation chamber 21 which is arranged within a tank or receptacle 22 surrounded by walls of insulating material.

The connection between the compressor and evaporation chamber is shown as comprising two sections 24, 25. Between the adjacent ends of said sections, and collars 23, 23[a], thereon, is clamped a member 26 in which the end of the conduit 14 is secured. A conduit 27 extends through the member 26 and connects the passage for compressed fluid surrounding the conduit 14 with the interior valve chamber of the evaporation chamber 21. As shown in Fig. 3 the outlet from the valve chamber 28 to the main evaporation chamber 21 is controlled by an expansion valve having a bellows shaped body 29.

In this arrangement the parts are supported by and connected with the shaft 4 by two counterbalanced arms 5, 31, a universal joint or ball 30 being provided in the insulating wall, the ball 30 is disposed in a rotatable bushing 30[a] and the shaft 4, at that portion which passes into the receptacle is offset from its axis of rotation and the offset portion 4[b] passes through the bushing 30[a] causing it to rotate with the shaft.

A suitable refrigerant fluid may be caused to circulate through the tank 22 and pipes 32, 33 connected therewith, or said pipes may serve merely to conduct air to and from the tank.

Means are also provided for imparting rotary motion to the peripheral grooved body 11 relative to the liquid in the casing in which it is arranged, said means, as shown, comprising a stationary band wheel 34 mounted co-axial with the shaft 4 and connected by an endless belt 35 with a pulley or wheel 36 on the outer end of the stem of the body 11 in which stem the conduit for conducting fluid to be compressed to the compressor is provided.

By thus rotating the compressor on its own axis as well as about the axis of shaft 4 a definite volume of fluid will be compressed in a given time. It will be seen that if the pulleys 34 and 36 are of the same size, the resulting motion given to the compressor elements will be the same as in the type of apparatus illustrated in Fig. 1. By making said pulleys of different sizes, however, the rate of compression may be varied. Thus the speed of rotation of the main shaft 4 determines the degree of pressure that the machine will produce, while the speed of rotation of the compressor element, as described, by the pulleys 34, 36 will determine the volume of fluid that will be compressed in a given time.

The body of the compressor and a portion of the conduit for compressed fluid are illustrated as being provided with suitable heat dissipating means, shown as a series of radially projecting fins 37.

As previously stated mercury is preferably employed as the compressor liquid and sulfur dioxid can be satisfactorily employed as the refrigerant as it has no chemical reaction with mercury or with iron of which material the compressor is constructed.

In Figs. 6 to 12 of the drawing, is illustrated a slightly different embodiment of the invention in which the several parts are arranged more compactly than in the forms shown in the other figures.

In the apparatus illustrated in these figures, the several parts are so arranged that the axis about which the compressor is bodily revolved is substantially vertical and the compressor is counterbalanced by the electric motor which is employed to rotate it.

Referring to said figures $4^a$ designates a vertically arranged upright or post, which is supported in a suitable frame 40. The compressor, evaporation chamber and intermediate parts are mounted in a frame 41 supported by suitable bearings on the standard $4^a$ and frame 40 so as to revolve freely, being arranged so that the axis of the compressor coil is inclined to the axis about which the supporting frame 41 revolves. As shown the compressor comprises a helical coil 42 of tubing of uniform diameter, of conical form, or gradually tapering from its upper, receiving end to its lower discharge end. Said coil connects the receiving and delivery chambers 43, 44 which are further connected by a conduit 45 extending axially of the compressor coil for the purpose of returning the compressor liquid from adjacent the discharge end of the coil to the inlet end thereof. The compressed fluid is conducted from the chamber 44 through a passage surrounding the conduit 45 and a condenser coil 46 to a chamber 47, which is adapted to communicate with the evaporation chamber $21^a$ through a conduit.

The ends of the compressor are supported in ball bearings in the frame 41 while the connection between the compressor and evaporation chamber is prevented from rotating about its axis by a universal, gimbal joint having two sets of axial studs $60^a$, $60^b$, so that as the machine is operated the compressor coil will have the same motion as the helical passage in the form of compressor illustrated in Figs. 1 and 2.

Communication between the chambers 47, $21^a$ is controlled by a float valve 50 which is so shaped and proportioned that it is opened intermittently to admit charges of the condensed compressed fluid to the evaporation chamber $21^a$.

The chamber 47 is provided with a series of inwardly projecting radial ribs, $47^a$ which act to prevent rotation of the condensed compressed fluid in the chamber. The valve is guided by pins $50^a$, $50^b$ at its upper and lower end, the latter extending through a guide plate 51 and terminating in the valve proper. It will be seen, therefore, that while the valve is adapted to move longitudinally it will normally, by the action of gravity and centrifugal force be held in position to close the entrance to the conduit 48 and the valve will remain in this closed relation until the gradual accumulation of condensed compressed fluid in the chamber creates sufficient buoyancy to overcome the centrifugal force and lift the valve.

The valve is so designed that such lifting will reduce the centrifugal force which tends to keep the valve closed, since, in lifting, the mass of the float and valve stem approach the main axis of rotation. Thus the valve will remain open until enough condensed compressed fluid has passed out of the chamber 47 to reduce the buoyancy of the float until it is overcome by the opposing centrifugal force when the valve will close. In this way the compressed fluid will be intermittingly discharged into the evaporation chamber $21^a$, and by this means a much larger valve may be used eliminating liability to clog or become stopped by any solid foreign matter.

The frame 41 is rotated by an electric motor 60 mounted in the frame on the opposite side of the axis of the upright $4^a$ from the compressor. As shown, the armature of the motor is provided with a pinion 61 that meshes with a gear 62 secured to the base in which the upright $4^a$ is supported and current is supplied to the motor from two contact rings 63, $63^a$ secured to said base and over which travel brushes 64 connected with the terminals of the motor winding.

The evaporation chamber $21^a$ is shown within a suitable inclosure 70 supported on the frame 40 and provided with suitable inlet and outlet pipes 71, 72. The walls of the inclosure 70 may be of suitable non heat conducting material.

The operation and advantages of the invention will be readily understood and appreciated from the drawings and the foregoing description. It will be seen that the compressor may be formed as a helical coil of uniform diameter having a conduit that gradually tapers or is reduced in cross sectional area from its inlet to its discharge end or as a tapering coil of tubing of uniform diameter throughout its length. The compressible fluid and compressor liquid employed are caused to travel through completely closed circuits or paths so that there is no danger of leakage, permitting the use of materials which might be objectionable or injurious to health if allowed to escape, and avoiding the necessity of attention and care to see that the correct amounts are always present. After the apparatus has been constructed and properly filled with the required materials at the factory, it can be permanently sealed and requires no consideration or attention by the user. A very small motor is required to operate it and in the preferred form, illustrated in Figs. 6 to 12, this serves as a counterbalance to the compressor to insure smooth rotation thereof. The apparatus is charged with sufficient mercury, so that when operating, there is always mercury present in the chamber 43, and as long as this mercury is present, it will enter the helical passage and be forced through said passage, by the movement of the helix about the axis of the shaft 4ª, into the chamber 44. The amount of mercury present is sufficient to insure filling the tube 45, and to insure sufficient mercury in the chamber 43 to feed the helical groove and in chamber 44, to seal the lower opening of the tube 45, and to provide for the proper amount of mercury in the helical tube. When the device is at rest, mercury is present in the annular passage surrounding the tube 45, but upon rotation, the fluid under pressure is forced into the chamber 44 and this fluid enters the annular passage and rises up through the mercury and forces the mercury therefrom into the chamber 44. With the device rotating about the shaft 4ª, the mercury must pass through the helical tube. The passage of this mercury builds up a pneumatic pressure or vapor pressure in the chamber 44 which pressure is exerted on the mercury in chamber 44, causing the mercury to move up the tube 45. The movement of the mercury through the tube 45 is due to two causes, first, the presence of sufficient mercury to cause a back flow, and second, the pneumatic pressure produced in the chamber 44. Sufficient mercury is contained in the apparatus to insure the presence of mercury in the chamber 43, when the apparatus is at rest. When the apparatus is started for the first time, the mercury is introduced into the low pressure chamber 43 in sufficient amount to insure the subsequent proper operation of the apparatus. This amount of mercury is such that when the apparatus is subsequently stopped, mercury will remain in the chamber 43 to insure proper subsequent starting. This amount of mercury is sufficient when the apparatus is at rest to partially fill the convolutions of the helical tube with spaced plugs of mercury, to fill the tube 45 and the chamber 44 and the passage surrounding the tube 45 and to leave sufficient mercury in the chamber 43, to insure the subsequent operation of the apparatus.

It will, of course, be understood that the various views are more or less diagrammatic and that the several parts may be differently proportioned from those shown.

As before stated, and as is evident, the apparatus may be readily employed as a vacuum pump. In such use the tube 18 will be connected with the space to be evacuated and the tube 19 with the atmosphere for example.

By supplying a suitable power fluid to the tube 19 and permitting exhaust through the tube 18 the apparatus is adapted for use as a prime mover.

Having thus described the invention what is claimed as new and desired to be secured by Letters Patent is:

1. The combination of a compressor including two chambers and a helically formed, tapering conduit communicating at its ends with said chambers, respectively, and supported to rotate about an axis extending at an angle to the axis of the helix, an evaporation chamber rigidly connected with the compressor, means for admitting condensed fluid compressed by the compressor to the evaporation chamber, and a conduit for returning fluid from the evaporation chamber to the chamber at the inlet end of the helically formed conduit.

2. The combination of a helically formed, tapering conduit and two chambers communicating respectively with the ends of said conduit, means for supporting the conduit to revolve about an axis extending at an angle to the axis of said helix, two concentric conduits extending axially of said helix from the chamber at the smaller end thereof, the inner of said conduits communicating with the chamber at the other end of the conduit, an evaporation chamber, means connecting the outer of said concentric conduits with the evaporation chamber, means for conducting fluid from the evaporation chamber to the chamber at the inlet end of the conduit, and means for revolving said conduit.

3. The combination of a compressor including a helically arranged, tapering conduit arranged in a position inclined outward from its larger to its smaller end, two chambers communicating, respectively, with the ends of the conduit, an evaporation chamber mounted on and communicating with the chamber at the larger end of the conduit, means for intermittently supplying condensed compressed fluid from the chamber at the smaller end of the conduit to the evaporation chamber, a conduit for returning compressor fluid from the chamber at the smaller end of the conduit to the chamber at the larger end thereof, and means for revolving the conduit about an axis extending at an angle to that of said helix.

4. The combination of a compressor comprising inlet and discharge chambers and an intermediate helically formed conduit, means for revolving the compressor about an axis forming an acute angle with the axis of said helix, an evaporation chamber, means for intermittently supplying compressed fluids from the discharge chamber, means for returning fluid to be compressed from the evaporation chamber to the inlet chamber of the compressor, and means for returning compressor liquid from the discharge chamber of the compressor to the inlet chamber thereof.

5. The combination of a compressor comprising inlet and discharge chambers and an intermediate helically formed conduit, means for revolving said compressor, an elevated evaporation chamber communicating with the inlet chamber of the compressor, a condenser coil surrounding the compressor and adapted to receive compressed fluid from the discharge chamber of the compressor, a chamber connected with the condenser coil and with the evaporation chamber, and a float valve in said chamber adapted to control the connection between said chamber and the evaporation chamber.

6. The combination of a compressor comprising inlet and discharge chambers and an intermediate helically formed conduit, means for revolving the compressor about an axis extending at an acute angle to the angle of its helix, an evaporation chamber, a conduit connecting the evaporation chamber and the inlet chamber of the compressor, a chamber connected with the discharge chamber of the compressor, and with the evaporation chamber, a valve in said chamber normally held by the centrifugal force in position to close communication between said chamber and the evaporation chamber, and adapted to be lifted by accumulation of condensed compressed fluid in said chamber, and means for returning compressor liquid from the discharge chamber of the compressor to the inlet chamber thereof.

7. The combination of a revolving compressor, a condenser, an evaporation chamber, means for conducting condensed compressed fluid from the compressor to the evaporation chamber including a float valve which is normally held closed by the action of centrifugal force and which is intermittently operated, being lifted when the buoyancy thereof due to accumulation of condensed compressed fluid thereabout overcomes the centrifugal force, said lifting reducing the centrifugal force, and which is closed as the buoyancy is reduced by escape of the condensed compressed fluid and the centrifugal force increased by the consequent lowering of the valve, and means for returning fluid from the evaporation chamber to the compressor.

8. The combination of a compressor including a helically formed conduit adapted to be rotated about an axis inclined to the axis of the helix, a condenser, an evaporation chamber, means for conducting condensed compressed fluid from the compressor to the evaporation chamber including a revolving chamber for condensed compressed fluid containing a float valve adapted to be held to its seat by the action of centrifugal force, said valve being guided to move in a straight line to and from the axis about which said chamber revolves, whereby the valve will remain closed until the buoyancy thereof due to accumulation of condensed compressed fluid in the chamber overcomes the centrifugal force sufficiently to move it nearer said axis and will be returned to closed position by centrifugal force as soon as a predetermined quantity of condensed compressed fluid has escaped from said chamber, and means for returning fluid from the evaporation chamber to the compressor.

9. The combination with a closed casing, of an expansion chamber arranged within said casing, means for moving said chamber in a circle in said casing to accelerate the transfer of heat from the medium in the casing to the chamber and means for supplying compressed fluid to said chamber.

10. The combination with a casing, of a fluid compressor, a fluid expansion device rigidly attached to the fluid compressor, the expansion device being arranged within the casing and the compressor being arranged without the casing, and means for rotating the two attached devices about an axis inclined to the axis of the attached devices.

11. The combination of a fluid compressor device, a fluid expansion device, a conduit rigidly connecting said devices and means for moving said devices bodily in circles about an axis inclined to the axis of the devices.

12. The combination of a fluid compressor device, a fluid expansion device rigidly secured thereto and means for moving said devices bodily in circles about an axis inclined to the axis of the devices.

13. The combination of a frame rotatable about an axis, a fluid compressor device mounted on said frame and disposed at an acute angle to the axis of rotation of said frame, a fluid expansion device mounted on said frame and disposed at an acute angle to the axis of rotation of the frame and a conduit connecting said devices.

14. The combination of a frame rotatable about an axis, a fluid compressor device mounted on said frame and disposed at an acute angle to the axis of rotation of the frame, an expansion device and means connecting the devices.

15. The combination of a frame rotatable about an axis, a fluid compressor device mounted on said frame and disposed at an acute angle to the axis of rotation of the frame, an expansion device, means connecting the devices and means for controlling the flow of fluid from the compressor device to the expansion device.

16. The combination of a fluid compressor device, a fluid expansion device and a connecting conduit arranged about a common axis, and means for moving the structure formed by the devices and the conduit about an axis inclined at an acute angle to and crossing said common axis at a point between said devices.

17. The combination with a casing, of a fluid compressor device arranged externally of the casing and adapted to be moved in a circle about an axis inclined to the axis of the compressor device, an expansion chamber arranged within the casing, and a conduit passing through the wall of the casing and rigidly connecting the compressor device and the expansion chamber.

18. The combination with a casing, of a fluid compressor device arranged externally of the casing and adapted to be moved in a circle about an axis inclined to the axis of the compressor device, an expansion chamber arranged within the casing, means extending through the wall of the casing and rigidly connecting the compressor device and the expansion chamber and means for controlling the flow of fluid into the expansion chamber.

19. In an apparatus of the character described, a unitary structure comprising a fluid compressor, a condenser coil carried thereon and an expansion chamber spaced from the compressor and means connecting the chamber rigidly to the compressor and means for moving said structure in a circular path about an axis inclined to the axis of the structure.

20. In a refrigerator the combination of an expansion chamber and a rotary refrigerant compressor containing a compressing liquid arranged to be circulated therein by the rotation of said compressor, a condenser for the refrigerant and a valve for the condenser refrigerant moving with said compressor and urged toward its seat by the centrifugal effect.

21. The combination of a frame rotatable about an axis, a refrigerant compressor comprising helical and return conduits containing a circulating body of compressing liquid and mounted on said frame with the axis of the helix disposed at an acute angle to said rotational axis, supply and return refrigerant tubes extending from said compressor conduits toward and beyond the said rotational axis, an expansion device connected to the ends of said tubes and means in the supply tube to regulate the flow of refrigerant to the expansion device.

In testimony whereof I affix my signature.

JAY GRANT DE REMER.